(12) United States Patent
Numano et al.

(10) Patent No.: US 8,969,751 B2
(45) Date of Patent: Mar. 3, 2015

(54) METHOD OF DETECTING DUST AND METHOD OF PREVENTING ERRONEOUS DETERMINATION OF DUST DETECTION

(75) Inventors: Masamitsu Numano, Tochigi (JP); Junya Tanabe, Tochigi (JP); Tetsuro Hayashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 730 days.

(21) Appl. No.: 12/570,579

(22) Filed: Sep. 30, 2009

(65) Prior Publication Data

US 2010/0163532 A1 Jul. 1, 2010

(30) Foreign Application Priority Data

Dec. 25, 2008 (JP) ................................. 2008-329138
Feb. 17, 2009 (JP) ................................. 2009-033445

(51) Int. Cl.
*B23K 9/10* (2006.01)
*B23K 11/34* (2006.01)
*B23K 11/25* (2006.01)

(52) U.S. Cl.
CPC ............... *B23K 11/34* (2013.01); *B23K 11/256* (2013.01)
USPC ........................................................ 219/108

(58) Field of Classification Search
USPC ................. 219/117.1, 110, 109, 108
See application file for complete search history.

(56) References Cited

U.S. PATENT DOCUMENTS 5,852,273 A * 12/1998 Ryudo et al. .................. 219/110
6,057,523 A * 5/2000 Fujii et al. ..................... 219/110

FOREIGN PATENT DOCUMENTS

| DE | 4409186 | | 12/1994 | | |
|---|---|---|---|---|---|
| DE | 4419071 | | 11/1995 | | |
| DE | 19518029 | | 11/1996 | | |
| EP | 0685289 | | 12/1995 | | |
| EP | 0743127 | | 11/1996 | | |
| JP | 03210977 | A * | 9/1991 | ............ | B23K 11/24 |
| JP | 2000-301348 | | 10/2000 | | |
| JP | 2001-138063 | | 5/2001 | | |
| JP | 2001138063 | A * | 5/2001 | ............ | B23K 11/25 |
| JP | 2005-334935 | | 12/2005 | | |
| JP | 2006-055893 | | 3/2006 | | |

OTHER PUBLICATIONS

Japanese Office Action, JP Application No. 2009-033445 dated Mar. 19, 2013, 2 pages.

* cited by examiner

*Primary Examiner* — Henry Yuen
*Assistant Examiner* — Ayub Maye
(74) *Attorney, Agent, or Firm* — Rankin, Hill & Clark LLP

(57) ABSTRACT

A method of detecting dust includes: a first step of monitoring a resistance value welding and determining if a variation amount of the resistance value per unit time is equal to or more than a first threshold; a second step of monitoring the resistance value after the first step and determining if a variation amount of this resistance value per unit time is equal to or less than a second threshold; a third step of determining if a difference value between a resistance value for calculating the variation amount equal to or more than the first threshold and a resistance value for calculating the variation amount determined equal to or less than the second threshold is equal to or more than a third threshold; and a fourth step of determining that dust is generated when the difference value is equal to or more than the third threshold.

2 Claims, 7 Drawing Sheets

METHOD OF DETECTING DUST AND METHOD OF PREVENTING ERRONEOUS DETERMINATION OF DUST DETECTION

This application is based on and claims the benefit of priority from Japanese Patent Applications Nos. 2008-329138 and 2009-033445, respectively filed on 25 Dec. 2008 and 17 Feb. 2009, the content of which is incorporated herein by reference.

BACKGROUND OF THE INVENTION

1. Field of the Invention

The present invention relates to a method of detecting dust and a method of preventing erroneous determination of dust detection during resistance welding such as spot welding.

2. Related Art

According to the related art, a lot of welding robots which spot-weld the predetermined part of a work conveyed by a conveyance device are arranged in a production line for welding car bodies and assembling thereof. These welding robots are provided with a spot welding gun having a shape appropriate for the predetermined welding part of a work.

These kind of welding robots monitor a resistance value while a welding current is applied. When dust is generated while a welding current is applied, a considerably decreased resistance value is monitored.

In the case in which such dust is generated, the strength of the welding part may be insufficient even after a predetermined welding current is applied for a predetermined current applying time. This is because the growing rate of a nugget decreases by the generated dust, and the size of the nugget becomes small.

Thus, welding robots are programmed so as to determine that dust is generated and perform a predetermined process on dust detection to shut off, increase, or decrease a welding current when the resistance value decreases while a welding current is applied (refer to Unexamined Japanese Patent Application, First Publication No. 2006-55893).

By the way, when welding operation is performed, for example, under condition in which the spot welding guns of two adjacent welding robots are close to each other, the magnetic field of the first spot welding gun affects that of the second spot welding gun, so that the resistance value may temporarily decrease. Such decrease of the resistance value is temporal, which is a noise fading out at once, not affecting welding quality.

However, on such noise generation, welding robots may erroneously determine that dust is generated due to the decrease of the resistance value. When erroneously determining that dust is generated in this way, welding robots perform a predetermined process on dust detection to shut off, increase, or decrease a welding current.

The process on dust detection based on such erroneous determination is performed, causing improper operation such as uselessly stopping welding operation and setting a welding current to an abnormal value.

In addition, when foreign matter such as dust enters between material members to be welded, the initial resistance value for resistance welding extremely increases compared with that at the start of normal resistance welding. Then, the foreign matter melts, so that the initial resistance value may rapidly decrease. In this case, welding robots erroneously determine that dust is generated due to the rapid decrease of the initial resistance value and perform a predetermined process on dust detection to shut off, increase, or decrease a welding current.

The process on dust detection based on such erroneous determination is performed, causing improper operation such us uselessly stopping welding operation and setting a welding current to an abnormal value.

SUMMARY OF THE INVENTION

It is an object of the present invention to provide a method of detecting dust which is capable of preventing erroneous determination of dust generation determined by noise generation and preventing erroneous operation performing a process on dust detection based on the erroneous determination.

It is another object of the present invention to provide a method of preventing erroneous determination of dust detection which is capable of preventing erroneous determination of dust generation determined by the rapid decrease of a resistance value which is caused by entered foreign matter such as dust and preventing erroneous operation performing a process on dust detection based the erroneous determination.

The method of detecting dust of the present invention detects dust generation during resistance welding, including: a first step (for example, the below-mentioned step S2 shown in FIG. 2) of monitoring a resistance value (for example, the below-mentioned resistance value r) during the resistance welding and determining whether or not a variation amount of the resistance value per unit time (for example, the below-mentioned variation amount rd of the resistance value) is equal to or more than a first threshold (for example, the below-mentioned first threshold T1); a second step (for example, the below-mentioned step S4 shown in FIG. 2) of monitoring the resistance value during the resistance welding after the first step and determining whether or not a variation amount of the resistance value per unit time is equal to or less than a second threshold (for example, the below-mentioned second threshold T2); a third step (for example, the below-mentioned step S5 shown in FIG. 2) of determining whether or not a difference value (for example, the below-mentioned difference value rD) between a resistance value (for example, the below-mentioned resistance value rm) for calculating the variation amount (for example, the below-mentioned variation amount rd5 of the resistance value) determined in the first step as being equal to or more than the first threshold and a resistance value (for example, the below-mentioned resistance value r10) for calculating the variation amount (for example, the below-mentioned variation amount rd10 of the resistance value) determined in the second step as being equal to or less than the second threshold is equal to or more than a third threshold (for example, the below-mentioned third threshold T3); and a fourth step (for example, the below-mentioned step S6 shown in FIG. 2) of determining that dust is generated when the difference value is equal to or more than the third threshold in the third step.

Accordingly, the present invention can prevent erroneous determination of dust generation determined by noise generation and erroneous operation performing a process on dust detection based the erroneous determination.

The method of preventing erroneous determination of dust detection of the present invention prevents an erroneous determination of a device monitoring a resistance value (for example, the below-mentioned resistance value r) during resistance welding and detecting dust generation when a variation amount of the resistance value per unit time (for example, the below-mentioned variation amount rd of the resistance value) is equal to or more than a threshold (for example, the below-mentioned threshold L), including: a first step (for example, the below-mentioned step S1 shown in FIG. 5) of setting an upper limit on a resistance value at the start of normal resistance welding as an upper limit threshold (for example, the below-mentioned upper limit threshold UL); a second step (for example, the below-mentioned step S3 shown in FIG. 5) of determining whether or not the resistance value during resistance welding exceeds the upper limit threshold; and a third step (for example, the below-mentioned step S6 shown in FIG. 5) of, when the resistance value exceeds the upper limit threshold, not performing operation on dust detection during a time when the resistance value exceeds the upper limit threshold and during a predetermined time (for example, the below-mentioned predetermined time T) after the resistance value returns to be equal to or less than the upper limit threshold.

Accordingly, the present invention can prevent erroneous determination of dust generation determined by the rapid decrease of a resistance value caused by entered foreign matter such as dust and prevent erroneous operation performing a process on dust detection based the erroneous determination.

DETAILED DESCRIPTION OF THE INVENTION

Figure 1:
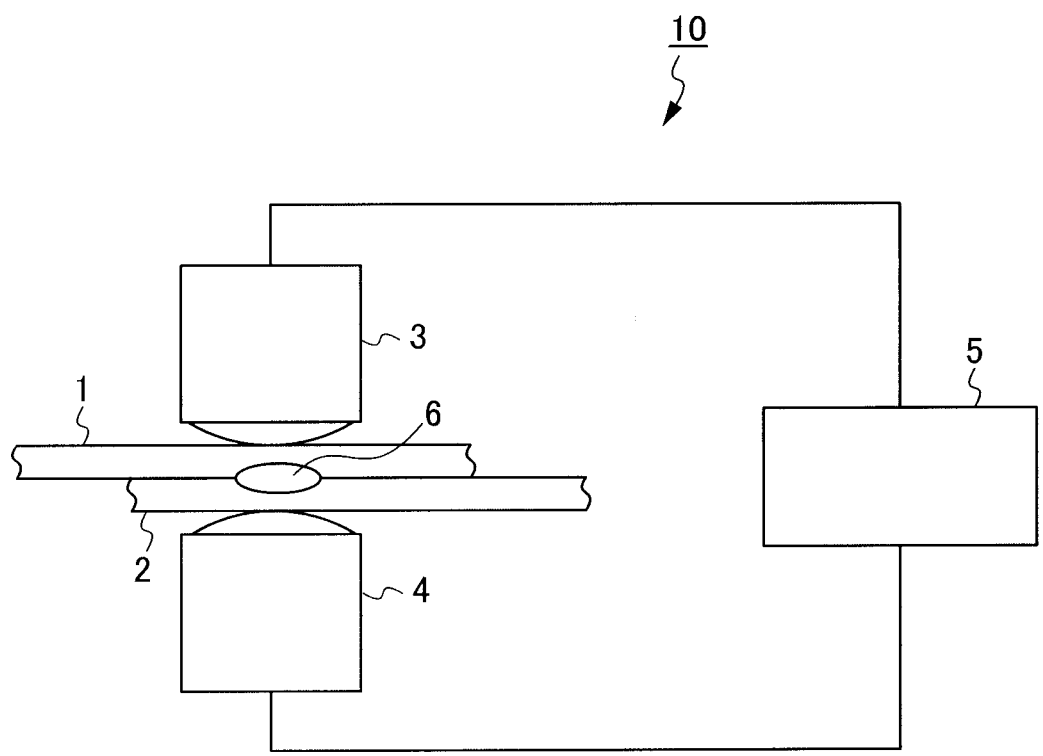
FIG. 1 is an outline explanatory drawing of a spot welding device performing the method of detecting dust according to a first embodiment of the present invention.

Hereinafter, the first embodiment of the present invention will be explained with reference to the drawings. FIG. 1 is an outline explanatory drawing of a spot welding device 10 performing the method of detecting dust according to the present invention. The spot welding device 10 is provided with a pair of electric tips 3 and 4 pressurizing accumulated material members 1 and 2 to be welded and applying a welding current thereto, a pressure device (not shown) applying pressure to the electric tips 3 and 4, a power supply device (not shown) supplying a welding current to the material members 1 and 2 pressurized by the pressure device through the electric tips 3 and 4, and a control unit 5 controlling thereof.

In the spot welding device 10 configured in this way, a welding current predetermined depending on a welding condition is applied to the material members 1 and 2 through the electric tips 3 and 4 for only a predetermined current applying time to grow a nugget 6 at a predetermined rate, thereby performing welding.

Figure 2:
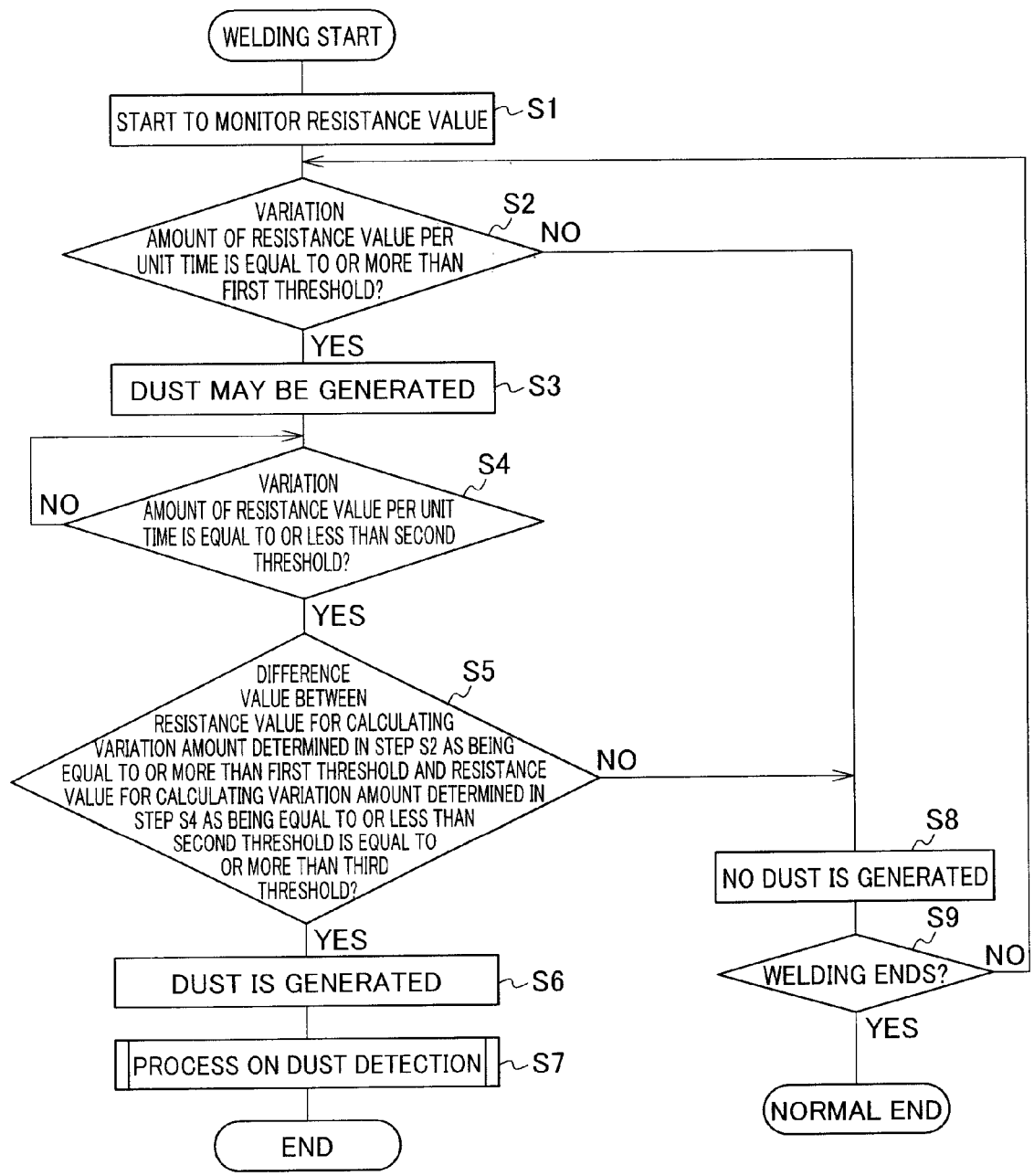
FIG. 2 is a flow chart of one embodiment of the method of detecting dust according to the first embodiment.

The control unit 5 detects dust generation in accordance with the flow chart of FIG. 2. A welding current for spot welding starts to be applied, and the control unit 5 starts to monitor the resistance value in the step S1. The resistance value is detected at every predetermined time interval. Specifically, the resistance value which the control unit 5 detects at the time t1 is defined as r1, and the resistance value which the control unit 5 detects at the time t2 a unit time after the time t1 is defined as r2. The control unit 5 repeats to detect the resistance value from the start of spot welding to the end at every unit time interval.

In the step S2, the control unit 5 determines whether or not the variation amount of the monitored resistance value per unit time is equal to or more than the first threshold. The control unit 5 detects the resistance value at every unit time interval to calculate the variation amount of the resistance value per unit time based on each of the resistance values at any consecutive two points. Then, the control unit 5 determines whether or not the calculated variation amount of the resistance value per unit time is equal to or more than the first threshold.

This first threshold represents the reduced amount of the resistance value decreased by dust generation in the variation amount of the resistance value per unit time. If this determination is "YES", the resistance value for calculating the variation amount is stored, and the process proceeds to the step S3. If this determination is "NO", the process proceeds to the step S8.

In the step S3, the control unit 5 determines that dust may be generated.

In the step S4, the control unit 5 determines whether or not the variation amount of the monitored resistance value per unit time is equal to or less than the second threshold.

This second threshold represents the reduced amount of the resistance value converged by the end of dust generation in the variation amount of the resistance value per unit time. If this determination is "YES", the process proceeds to the step S5. If this determination is "NO", the process returns to the step S4. Thus, the determination of the step S4 is repeated until the variation amount of the resistance value per unit time becomes equal to or less than the second threshold.

In the step S5, the control unit 5 reads out the resistance value for calculating the variation amount determined in the step S2 as being equal to or more than the first threshold and determines that the difference value between this resistance value and the resistance value for calculating the variation amount determined in the step S4 as being equal to or less than the second threshold is equal to or more than the third threshold.

This third threshold is used for distinguishing the reduced amount of the resistance value decreased by dust generation from the reduced amount of the resistance value decreased by noise generation. For example, the third threshold T3 is set to 5-50 $\mu\Omega$. If this determination is "YES", the process proceeds to the step S6. If this determination is "NO", the process proceeds to the step S8.

In the step S6, the control unit 5 determines that dust is generated.

In the step S7, the control unit 5 performs the process on dust detection. Specifically, the control unit 5 performs the process preprogrammed as the process on dust detection, for example, to shut off, increase, or decrease a welding current. After the predetermined process on dust detection completes, welding operation ends.

In the step S8, the control unit 5 determines that no dust is generated.

Then, in the step S9, the control unit 5 determines whether or not welding has ended. Specifically, the control unit 5 refers to the predetermined welding program to determine whether or not welding has ended.

If welding has not ended, the determination of the step S9 is "NO", and the process returns to the step S2. In the case in which the determination of the step S5 is "NO", the process proceeds to the step S8 followed by the step S9, the determination of the step S9 is "NO", and the process returns to the step S2, the resistance value is continuously monitored until the end of welding, since noise is generated during welding.

While the process in which the determination of the step S2 is "NO", the process proceeds to the step S8 followed by the step S9, the determination of the step S9 is "NO", and the process returns to the step S2 is repeated, the state in which the variation amount of the resistance value per unit time is less than the first threshold is maintained. Thus, normal welding operation without dust and noise generation is performed.

Then, when welding ends, the determination of the step S9 becomes "YES", and welding operation ends normally.

Figure 3:
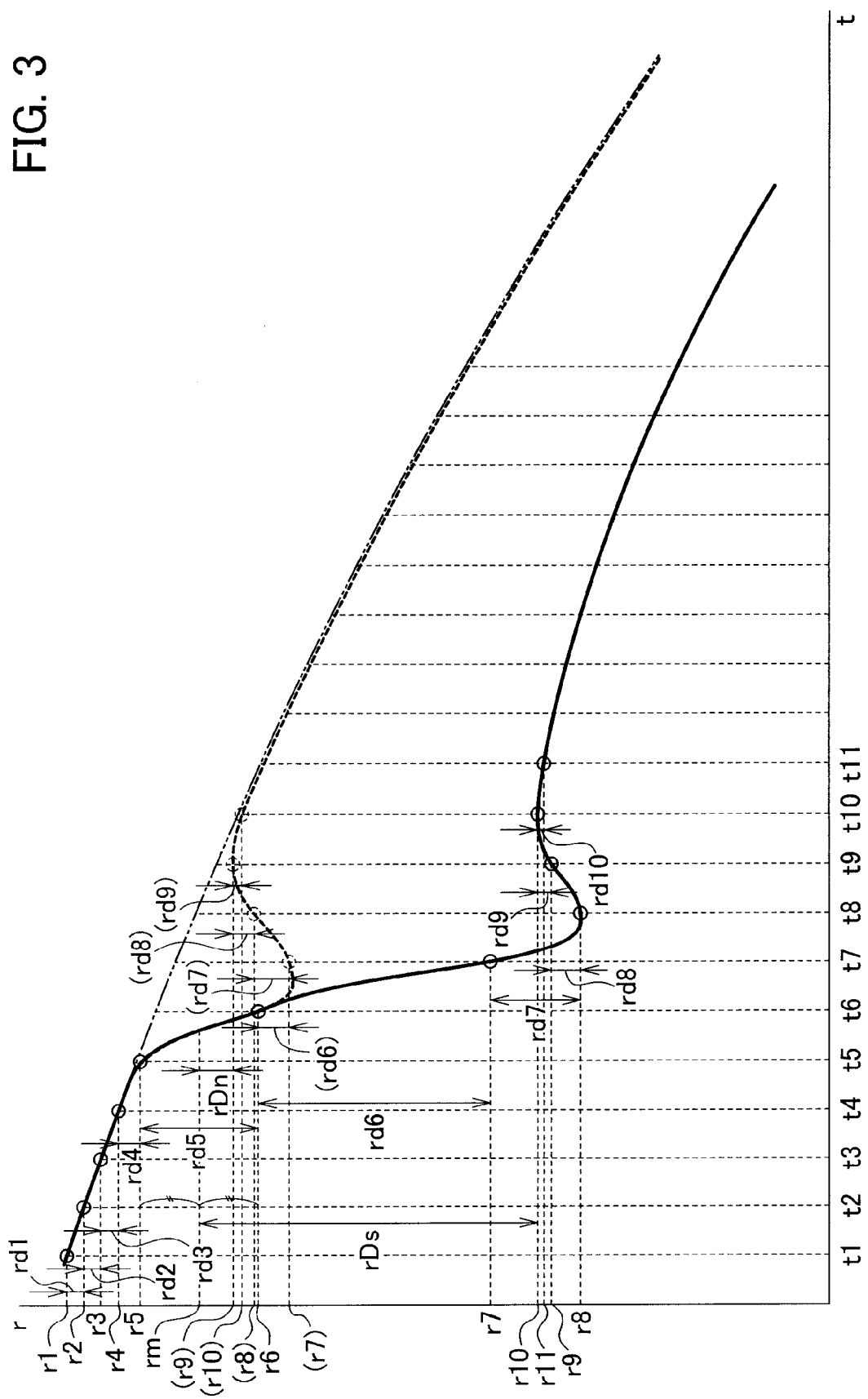
FIG. 3 is a timing chart illustrating the relationship between the time of applying a welding current and the resistance value in the method of detecting dust according to the first embodiment.

FIG. 3 is a timing chart illustrating the relationship between the time of applying a welding current and the resistance value in the method of detecting dust according to the first embodiment. In FIG. 3, the continuous line illustrates the relationship between the current applying time and the resistance value when welding operation is not normally performed since dust is generated during welding operation. For comparison, the dashed line illustrates the relationship between the current applying time and the resistance value when dust is generated during welding operation but welding operation is practically and normally performed. In addition, the two-dot chain line illustrates the relationship between the current applying time and the resistance value when welding operation is normally performed.

In FIG. 3, the dust generation illustrated by the continuous line and the noise generation illustrated by the dashed line have in common because the resistance value falls by dust or noise generation, but in contrast because there is a significant difference in the reduced amount of the resistance value. Specifically, in the case of the dust generation illustrated by the continuous line, the resistance value falls more sharply and does not return to a normal level after falling. On the other hand, in the case of the noise generation illustrated by the dashed line, the resistance value falls less sharply and returns to a normal level immediately after falling.

As the continuous line illustrates in FIG. 3, determination is made as follows in accordance with the flow chart shown in FIG. 2 when dust is generated during welding operation. Specifically, the control unit 5 starts to monitor the resistance value. This allows the control unit 5 to detect the resistance value r2 at every unit time interval. The resistance value r1 is detected at the time t1, and the resistance value r2 is detected at the time t2 a unit time later. Then, the difference value between the resistance value r1 and the resistance value r2 is calculated as the variation amount rd1 of the resistance value. The variation amount rd1 of the resistance value is not equal to or more than the first threshold T1, so that it is determined that no dust is generated. The resistance value r3 is detected at the time t3 a unit time later. Then, the difference value between the resistance value r2 and the resistance value r3 is calculated as the variation amount rd2 of the resistance value. The variation amount rd2 of the resistance value is not equal to or more than the first threshold T1, so that it is determined that no dust is generated. The resistance values r4 and r5 are respectively detected at the times t4 and t5 a unit time later. Then, the difference value between the resistance value r3 and the resistance value r4 is calculated as the variation amount rd3 of the resistance value, and the difference value between the resistance value r4 and the resistance value r5 is calculated as the variation amount rd4 of the resistance value. The variation amounts rd3 and rd4 of the resistance value are not equal to or more than the first threshold T1, so that it is determined that no dust is generated.

The resistance value r6 is detected at the time t6 a unit time later. Then, the difference value between the resistance value r5 and the resistance value r6 is calculated as the variation amount rd5 of the resistance value. The variation amount rd5 of the resistance value is equal to or more than the first threshold T1, so that it is determined that dust may be generated.

The resistance value r7 is detected at the time t7 a unit time later. Then, the difference value between the resistance value r6 and the resistance value r7 is calculated as the variation amount rd6 of the resistance value. The variation amount rd6 of the resistance value is not equal to or less than the second threshold T2. The resistance values r8, r9, and r10 are respectively detected at the times t8, t9, and t10 a unit time later. Then, the difference value between the resistance value r7 and the resistance value r8 is calculated as the variation amount rd7 of the resistance value, the difference value between the resistance value r8 and the resistance value r9 is calculated as the variation amount rd8 of the resistance value, and the difference value between the resistance value r9 and the resistance value r10 is calculated as the variation amount rd9 of the resistance value. The variation amounts rd7, rd8, and rd9 of the resistance value are not equal to or less than the second threshold T2.

The resistance value r11 is detected at the time t11 a unit time later. Then, the difference value between the resistance value r10 and the resistance value r11 is calculated as the variation amount rd10 of the resistance value. The variation amount rd10 of the resistance value is equal to or less than the second threshold T2.

At this point, the difference value rD between the resistance value rm for calculating the variation amount rd5 of the resistance value at the time t6 and the resistance value r10 for calculating the variation amount rd10 of the resistance value at the time t11 is calculated because the variation amount rd10 of the resistance value becomes equal to or less than the second threshold T2. This difference value rD is the difference value rDs equal to or more than the third threshold 13, so that it is determined that dust is generated.

As the dashed line illustrates in FIG. 3, determination is made as follows in accordance with the flow chart shown in FIG. 2 when noise is generated during welding operation. Specifically, the control unit 5 starts to monitor the resistance value. The resistance values r1, r2, r3, r4, and r5 are detected at the times t1, t2, t3, t4, and t5 respectively. Then, the difference value between the resistance value r1 and the resistance value r2 is calculated as the variation amount rd1 of the resistance value, the difference value between the resistance value r2 and the resistance value r3 is calculated as the variation amount rd2 of the resistance value, the difference value between the resistance value r3 and the resistance value r4 is calculated as the variation amount rd3 of the resistance value, and the difference value between the resistance value r4 and the resistance value r5 is calculated as the variation amount rd4 of the resistance value. The variation amounts rd1, rd2, rd3, and rd4 of the resistance value are not equal to or more than the first threshold T1, so that it is determined that no dust is generated.

The resistance value r6 is detected at the time t6 a unit time later. Then, the difference value between the resistance value r5 and the resistance value r6 is calculated as the variation amount rd5 of the resistance value. The variation amount rd5 of the resistance value is equal to or more than the first threshold T1, so that it is determined that dust may be generated.

The resistance values (r7), (r8), and (r9) are detected at the times t7, t8, and t9 respectively. Then, the difference value between the resistance value r6 and the resistance value (r7) is calculated as the variation amount (rd6) of the resistance value, the difference value between the resistance value (r7) and the resistance value (r8) is calculated as the variation amount (rd7) of the resistance value, and the difference value between the resistance value (r8) and the resistance value (r9) is calculated as the variation amount (rd8) of the resistance value. The variation amounts (rd6), (rd7), and (rd8) of the resistance value are not equal to or less than the second threshold T2.

The resistance value (r10) is detected at the time t10 a unit time later. Then, the difference value between the resistance value (r9) and the resistance value (r10) is calculated as the variation amount (rd9) of the resistance value. The variation amount (rd9) of the resistance value is equal to or less than the second threshold T2.

At this point, the difference value rD between the resistance value rm for calculating the variation amount rd5 of the resistance value at the time t6 and the resistance value (r9) for calculating the variation amount (rd9) of the resistance value at the time t10 is calculated because the variation amount (rd9) of the resistance value becomes equal to or less than the second threshold T2. This difference value rD is the difference value rDn less than the third threshold T3, so that it is determined that no dust is generated.

The present embodiment has the following effects.

(1) The control unit 5 can prevent erroneous determination of dust generation determined by noise generation and erroneous operation performing a process on dust detection based the erroneous determination.

(2) The control delay does not occur because the difference value rDs is calculated, thereby determining that dust is generated, at the same time when the resistance value r11 is detected at the time t11.

Figure 4:
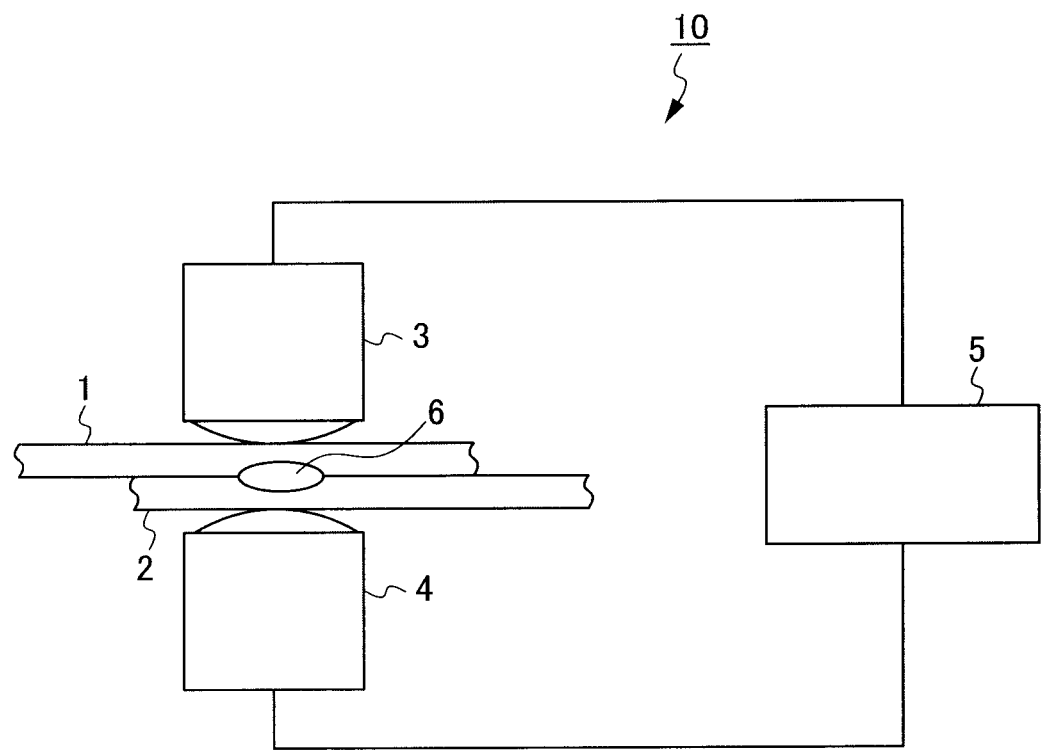
FIG. 4 is an outline explanatory drawing of a spot welding device performing the method of preventing erroneous determination of dust detection according to a second embodiment of the present invention.

Hereinafter, the second embodiment of the present invention will be explained with reference to the drawings. FIG. 4 is an outline explanatory drawing of a spot welding device 10 performing the method of preventing erroneous determination of dust detection according to the present invention.

The spot welding device 10 is provided with a pair of electric tips 3 and 4 pressurizing accumulated material members 1 and 2 to be welded and applying a welding current thereto, a pressure device (not shown) applying pressure to the electric tips 3 and 4, a power supply device (not shown) supplying a welding current to the material members 1 and 2 pressurized by the pressure device through the electric tips 3 and 4, and a control unit 5 controlling thereof.

In the spot welding device 10 configured in this way, a welding current predetermined depending on a welding condition is applied to the material members 1 and 2 through the electric tips 3 and 4 for only a predetermined current applying time to grow a nugget 6 at a predetermined rate, thereby performing welding.

Figure 5:
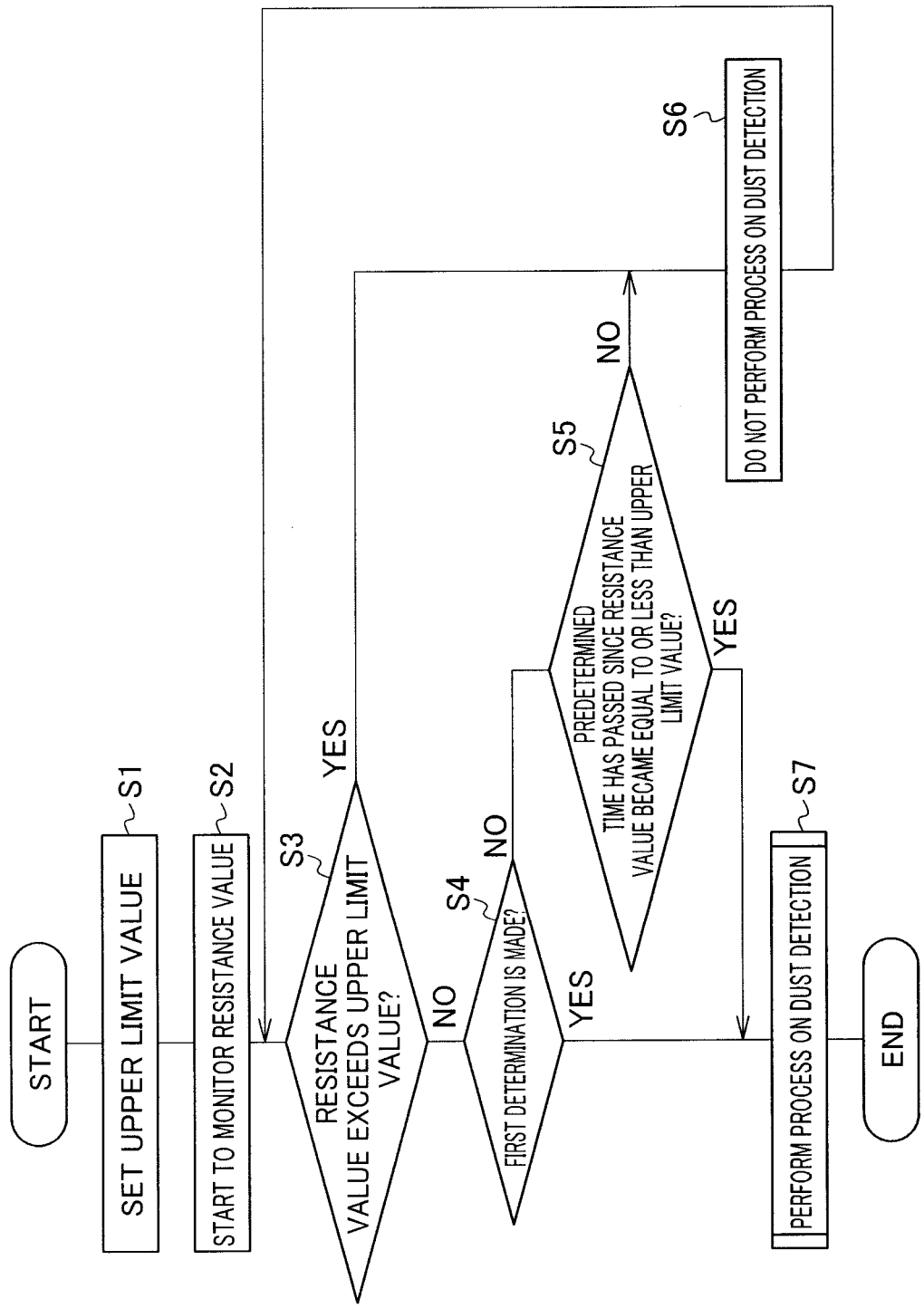
FIG. 5 is a flow chart of one embodiment of the method of preventing erroneous determination of dust detection according to the second embodiment.
Figure 6:
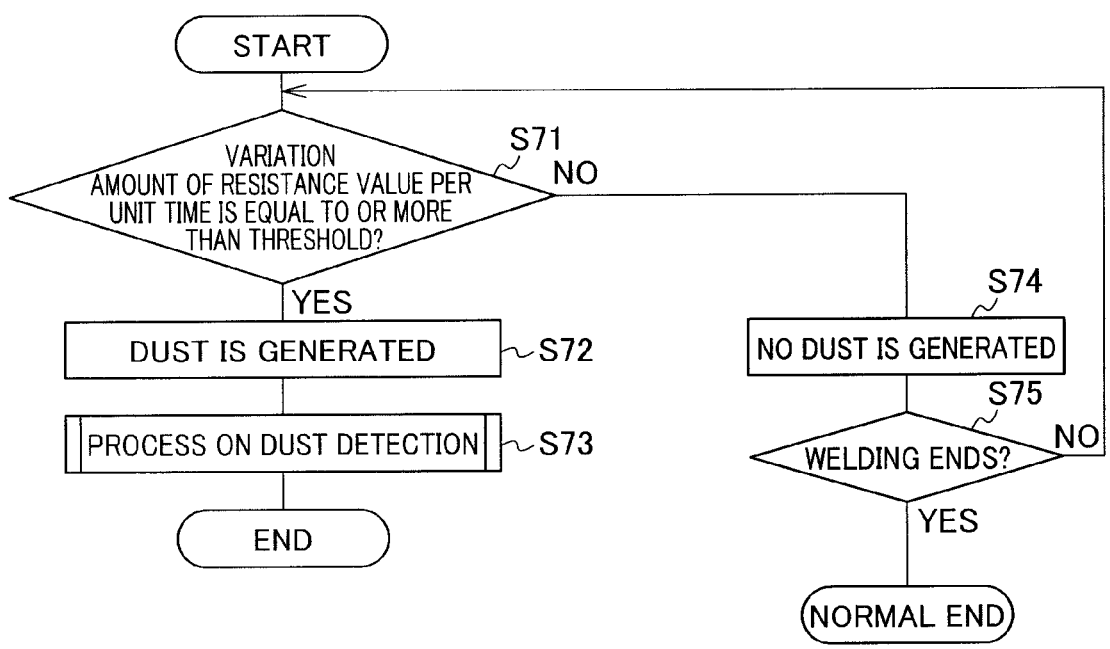
FIG. 6 is a detailed flow chart of the step S7 shown in FIG. 5.

The control unit 5 detects dust generation in accordance with the flow chart of FIGS. 5 and 6. In the flow chart of FIG. 5, the control unit 5 first defines the upper limit of the range of the interelectrode resistance as the upper limit threshold in the step S1. Hereinafter, "the range of the interelectrode resistance" is the usual range of the interelectrode resistance at the moment of the start of welding material members under normal conditions, for example, in which foreign matter is not entered, by resistance welding. Specifically, the upper limit threshold is set to 50-500 μΩ.

In the step S2, the control unit 5 starts to monitor the resistance value. The resistance value is detected at every predetermined time interval. Specifically, the resistance value which the control unit 5 detects at the time t1 is defined as r1, and the resistance value which the control unit 5 detects at the time t2 a unit time after the time t1 is defined as r2. The control unit 5 repeats to detect the resistance value from the start of spot welding to the end at every unit time interval.

In the step S3, the control unit 5 determines whether or not the monitored resistance value exceeds the upper limit threshold. If this determination is "NO", the number of times of the determinations made in the step S3 is stored, and the process proceeds to the step S4. If this determination is "YES", the process proceeds to the step S6.

In the step S4, the control unit 5 determines whether or not the number of times of the determinations made in the step S3 is one. Specifically, the control unit 5 determines whether or not it is determined that the resistance value is equal to or less than the upper limit threshold at the first determination of the step S3. If this determination is "NO", the process proceeds to the step S5. If this determination is "YES", the process returns to the step S7.

In the step S5, the control unit 5 determines whether or not the predetermined time has passed since the monitored resistance value became equal to or less than the upper limit threshold. In this case, the resistance value monitored by the control unit 5 once exceeded the upper limit threshold, but returns to be equal to or less than the upper limit threshold later. Therefore, the time until the resistance value become equal to that at the start of normal welding is defined as the predetermined time after the resistance value becomes equal to or less than the upper limit threshold.

This predetermined time varies depending on the types of material members to be welded. It also varies depending on entered foreign matter such as dust. The foreign matter includes sealer, dust, and the like. The resistance value may fall sharply at the moment that material members such as high tension steel sheets with a wide gap fit and contact to each other. Therefore, the predetermined time is previously determined in accordance with the characteristics of material members to be welded from experiment. In the present embodiment, the predetermined time is set to 2-50 microseconds. If the determination of the step S5 is "NO", the process proceeds to the step S6. If this determination is "YES", the process returns to the step S7.

In the step S6, the control unit 5 does not perform the operation on dust detection. If the determination of the step S3 is "YES", the process returns to the step S3 without the operation on dust detection performed because the resistance value monitored by the control unit 5 exceeds the upper limit threshold.

If the determination of the step S5 is "NO", the process returns to the step S3 without the operation on dust detection performed because the resistance value monitored by the control unit 5 once exceeded the upper limit threshold, but returns to be equal to or less than the upper limit threshold later, yet the time until the resistance value become equal to that at the start of normal welding has not passed after the resistance value became equal to or less than the upper limit threshold.

Specifically, the process returns to the step S3 without the operation on dust detection performed while the resistance value monitored by the control unit 5 exceeds the upper limit threshold, and until the resistance value become equal to that at the start of normal welding after the resistance value monitored by the control unit 5 returns to be equal to or less than the upper limit threshold.

In the step S7, the control unit 5 performs the operation on dust detection.

At this point, the resistance value monitored by the control unit 5 is equal to or less than the upper limit threshold from the start of welding.

The operation on dust detection in the step S7 will be explained with reference to the flow chart of FIG. 6.

In the step S71, the control unit 5 determines whether or not the variation amount of the monitored resistance value per unit time is equal to or more than a threshold. The control unit 5 detects the resistance value at every unit time interval to calculate the variation amount of the resistance value per unit time based on each of the resistance values at any consecutive two points. Then, the control unit 5 determines whether or not the calculated variation amount of the resistance value per unit time is equal to or more than the threshold.

This threshold represents the reduced amount of the resistance value decreased by dust generation in the variation amount of the resistance value per unit time. If this determination is "YES", the process proceeds to the step S72. If this determination is "NO", the process proceeds to the step S74.

In the step S72, the control unit 5 determines that dust is generated.

In the step S73, the control unit 5 performs the process on dust detection. Specifically, the control unit 5 performs the process preprogrammed as the process on dust detection, for example, to shut off, increase, or decrease a welding current. After the predetermined process on dust detection completes, welding operation ends.

In the step S74, the control unit 5 determines that dust is not generated.

Then, in the step S75, the control unit 5 determines whether or not welding has ended. Specifically, the control unit 5 refers to the predetermined welding program to determine whether or not welding has ended.

If welding has not ended, the determination of the step S75 is "NO", and the process returns to the step S71. While the process in which the determination of the step S71 is "NO", the process proceeds to the step S74 followed by the step S75, the determination of the step S75 is "NO", and the process returns to the step S71 is repeated, the state in which the variation amount of the resistance value per unit time is less than the threshold is maintained. Thus, normal welding operation without dust generation is performed.

Then, when welding ends, the determination of the step S75 becomes "YES", and welding operation ends normally.

Figure 7:
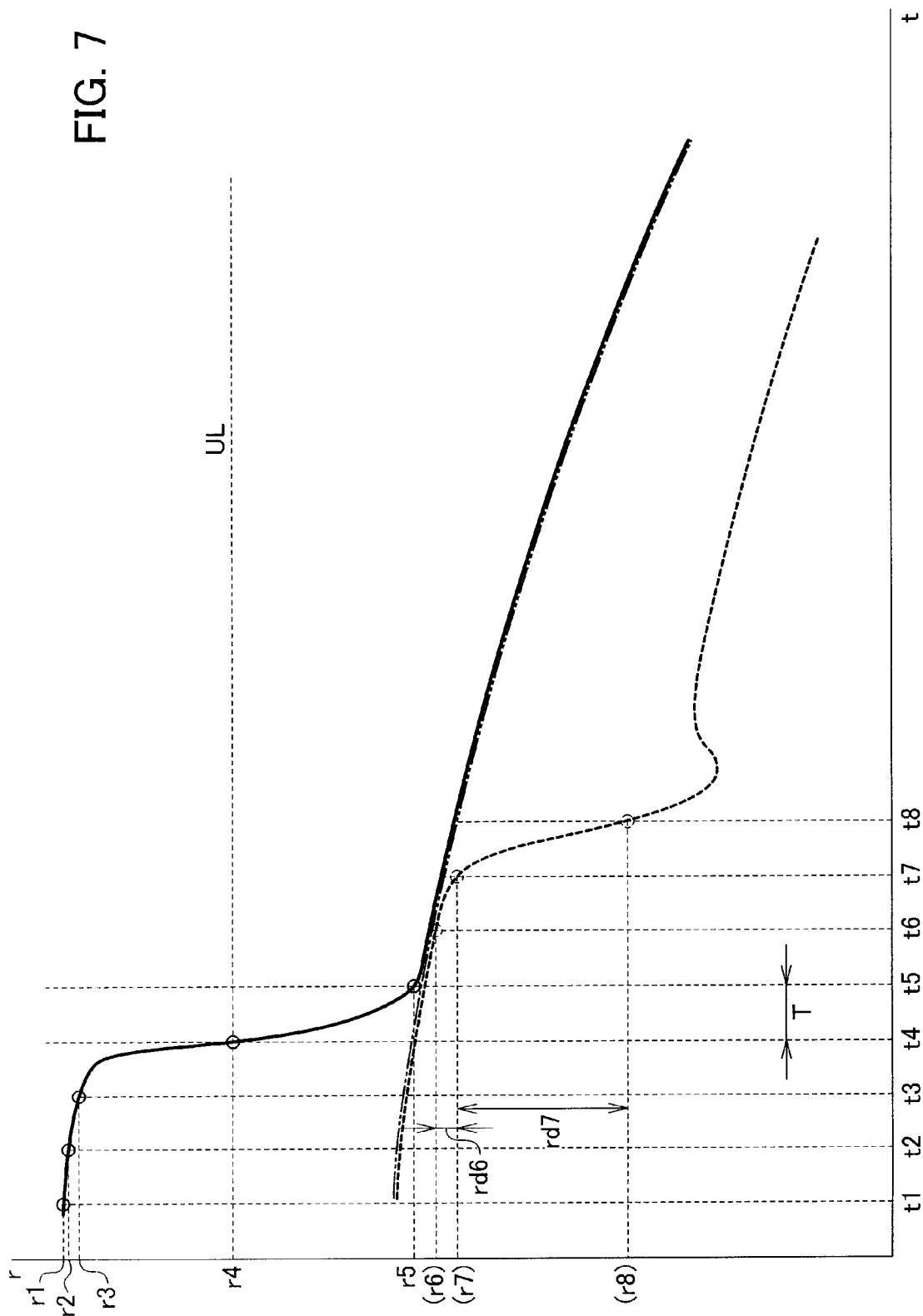
FIG. 7 is a timing chart illustrating the relationship between the time of applying a welding current and the inter-electrode resistance value in the method of preventing erroneous determination of dust detection according to the second embodiment.

FIG. 7 is a timing chart illustrating the relationship between the time of applying a welding current and the interelectrode resistance value in the method of preventing erroneous determination of dust detection according to the second embodiment. In FIG. 7, the continuous line illustrates the relationship between the current applying time and the interelectrode resistance value when the interelectrode resistance value is abnormally high at the start of welding operation by foreign matter such as dust entered between material members to be weld, and the resistance value decreases to a normal value by melted foreign matter. The dashed line illustrates the relationship between the current applying time and the interelectrode resistance value when welding operation is not normally performed since dust is generated during welding operation, for comparison. In addition, the two-dot chain line illustrates the relationship between the current applying time and the interelectrode resistance value when welding operation is normally performed.

As the continuous line illustrates in FIG. 7, determination is made as follows in accordance with the flow chart shown in FIG. 5 when dust is entered at the start of welding operation. Specifically, the control unit 5 detects the resistance value r at every unit time interval.

The resistance value r1 is detected at the time t1. It is determined that the operation on dust detection is not performed because the resistance value r1 exceeds the upper limit threshold UL. The resistance value r2 is detected at the time t2 a unit time later. The resistance value r3 is detected at the time t3 a unit time later. It is determined that the operation on dust detection is not performed because the resistance values r2 and r3 exceed the upper limit threshold UL.

The resistance value r4 is detected at the time t4 a unit time later. At this point, the resistance value r4 is equal to the upper limit threshold UL, but the predetermined time T has not passed since the resistance value r4 became equal to the upper limit threshold UL, and it is thus determined that the operation on dust detection is not performed.

The resistance value r5 is detected at the time t5. The resistance value r5 is equal to the resistance value at the start of normal welding. In this case, it is determined that the operation on dust detection is performed because the elapsed time from the time t4 to the time t5 is equal to the predetermined time T. Thereafter, the operation on dust detection is repeated at every unit time interval until welding ends.

FIG. 7 shows the length of the predetermined time T until the resistance value monitored by the control unit 5 becomes equal to the resistance value at the start of normal welding after it becomes equal to or less than the upper limit threshold is equal to that of every unit time interval at which the control unit 5 detects the resistance value r. However, there is no correlation between the predetermined time T and the unit time interval, the lengths of which are varied.

As the continuous line illustrates in FIG. 7, determination is made as follows in accordance with the flow chart shown in FIG. 6 when dust is generated during welding operation. The explanation regarding the period between the time t1 and the time t5 is omitted.

The resistance value (r6) is detected at the time t6, and the resistance value (r7) is detected at the time t7 a unit time later. Then, the difference value between the resistance value (r6) and the resistance value (r7) is calculated as the variation amount rd6 of the resistance value. The variation amount rd6 of the resistance value is not equal to or more than the threshold L, so that it is determined that no dust is generated.

The resistance value (r8) is detected at the time t8 a unit time later. Then, the difference value between the resistance value (r7) and the resistance value (r8) is calculated as the variation amount rd7 of the resistance value. The variation amount rd7 of the resistance value is equal to or more than the threshold L, so that it is determined that dust is generated.

The present embodiment has the following effects.

(3) The control unit 5 can prevent from erroneously determining that dust is generated because of sharp decrease of the resistance value due to entered foreign matter, by not performing the operation on dust detection while the resistance value is abnormal due to entered foreign matter such as dust.

(4) The control unit 5 can prevent improper operation such as uselessly stopping welding operation and setting a welding current to an abnormal value, which caused by the process performed on dust generation to shut off, increase, or decrease a welding current based on the erroneous determination of dust generation.

(5) Welding failure caused by erroneous operation as a processing result based on the erroneous determination of dust generation can be prevented from occurring.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A method of detecting dust generation during resistance welding, comprising the steps of:
   providing a pair of material members to be welded together;
   providing a pair of electric tips that are adapted to apply a welding current to said pair of material members;
   providing a control unit that is adapted to provide the welding current to the electric tips;
   applying said welding current to said pair of material members to begin resistance welding of said material members;
   and further comprising the steps of:
   A) monitoring a resistance value during resistance welding and determining whether a first calculated variation amount of the resistance value per unit time is equal to or more than a first predetermined threshold set in advance based on a reduced amount of the resistance value that decreases when is dust generated;
   A1) when the first calculated variation amount is determined to be less than said first predetermined threshold, repeating step A);
   B) when the first calculated variation amount is determined to be equal to or more than said first predetermined threshold, continuing to monitor the resistance value during resistance welding after step A) and determining whether a second calculated variation amount of the resistance value per unit time is equal to or less than a second predetermined threshold set in advance based on a reduced amount of the resistance value converged by an end of dust generation;
   B1) when the second calculated variation amount is determined to be more than the second predetermined threshold, repeating step B);
   C) when said first calculated variation amount is determined to be equal to or more than said first predetermined threshold and said second calculated variation amount is equal to or less than said second predetermined threshold, determining whether a difference value between the resistance value for calculating the first calculated variation amount in step A) and the resistance value for calculating the second calculated variation amount in step B) is equal to or more than a third predetermined threshold set in advance based on the reduced amount of the resistance value that decreases when dust is generated, and a reduced amount of the resistance value that decreases when noise is generated;
   C1) when said difference value is determined to be less than the third predetermined threshold, returning to step A); and
   D) when said difference value is determined to be equal to or more than said third predetermined threshold, concluding that dust is generated.

2. A method of preventing erroneous determination of dust detection preventing an erroneous determination of a device monitoring a resistance value during resistance welding and detecting dust generation when a variation amount of the resistance value per unit time is equal to or more than a predetermined threshold, comprising the steps of:
   providing a pair of material members to be welded together;
   providing a pair of electric tips that are adapted to apply a welding current to said pair of material members;
   providing a control unit that is adapted to provide the welding current to the electric tips;
   applying said welding current to said pair of material members to begin resistance welding of said material members;
   and further comprising the steps of:
   A) setting an upper limit of a resistance value at a start of normal resistance welding as a predetermined upper limit threshold;
   B) monitoring an actual resistance value during resistance welding and determining whether the actual resistance value during resistance welding exceeds the predetermined upper limit threshold; and
   C) when the actual resistance value exceeds the predetermined upper limit threshold, not performing an operation of dust detection during a time when the actual resistance value exceeds the predetermined upper limit threshold and during a predetermined time after the actual resistance value returns to be equal to or less than the predetermined upper limit threshold, the predetermined time set in advance as a time from when the resistance value becomes equal to or less than the upper limit threshold, until the resistance value becomes equal to a resistance value of normal welding.

* * * * *